United States Patent
Shinzaki et al.

(10) Patent No.: US 11,436,439 B2
(45) Date of Patent: Sep. 6, 2022

(54) SYSTEM AND METHOD FOR GENERATING LABEL CANDIDATES RELATED TO RECOGNITION TARGET FOR SELECTION AND LEARNING

(71) Applicant: PANASONIC INTELLECTUAL PROPERTY MANAGEMENT CO., LTD., Osaka (JP)

(72) Inventors: Makoto Shinzaki, Kanagawa (JP); Daisuke Ueta, Kanagawa (JP); Yuichi Matsumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/256,829

(22) PCT Filed: Apr. 23, 2019

(86) PCT No.: PCT/JP2019/017237
§ 371 (c)(1),
(2) Date: Dec. 29, 2020

(87) PCT Pub. No.: WO2020/008711
PCT Pub. Date: Jan. 9, 2020

(65) Prior Publication Data
US 2021/0158101 A1    May 27, 2021

(30) Foreign Application Priority Data

Jul. 2, 2018    (JP) .............................. JP2018-126400

(51) Int. Cl.
*G06K 9/62*    (2022.01)
(52) U.S. Cl.
CPC ......... *G06K 9/6259* (2013.01); *G06K 9/6254* (2013.01)

(58) Field of Classification Search
None
See application file for complete search history.

(56) References Cited

U.S. PATENT DOCUMENTS

| | | | |
|---|---|---|---|
| 8,233,720 B2 * | 7/2012 | Waragai | G06K 9/6296 382/205 |
| 9,087,381 B2 * | 7/2015 | Tsao | G06T 7/593 |

(Continued)

FOREIGN PATENT DOCUMENTS

| | | |
|---|---|---|
| JP | 2014-178957 | 9/2014 |
| JP | 2017-111731 | 6/2017 |
| WO | 2014/208575 | 12/2014 |

OTHER PUBLICATIONS

Extended European Search Report dated Jul. 27, 2021 issued in European patent application No. 19831343.9.

(Continued)

*Primary Examiner* — Tahmina N Ansari
(74) *Attorney, Agent, or Firm* — Greenblum & Bernstein, P.L.C.

(57) ABSTRACT

In generation of training data for image recognition, in order to reduce a user's workload of assigning a label to a captured image, a learning device includes a processor for performing operations to generate training data and a display device, wherein the processor is configured to acquire a captured image from an image capturing device; acquire one or more candidate objects recognized based on an identification model for a recognition target included in the captured image; and display, on the display device, information on the candidate objects as respective label candidates for the captured image.

19 Claims, 12 Drawing Sheets

(56) References Cited

U.S. PATENT DOCUMENTS

| | | | | |
|---|---|---|---|---|
| 9,367,567 B2* | 6/2016 | Matsumoto | | G06K 9/4647 |
| 10,535,143 B2* | 1/2020 | Matsumoto | | H04N 7/181 |
| 2009/0232403 A1* | 9/2009 | Waragai | | G06K 9/6296 |
| | | | | 382/209 |
| 2015/0131897 A1* | 5/2015 | Tsao | | G06K 9/00718 |
| | | | | 382/154 |
| 2016/0132731 A1* | 5/2016 | Hisada | | G06K 9/6253 |
| | | | | 382/103 |
| 2019/0197319 A1* | 6/2019 | Hisada | | G06K 9/00771 |

OTHER PUBLICATIONS

Li Dawei et al.: "DeepCham: Collaborative Edge-Mediated Adaptive Deep Learning for Mobile Object Recognition", 2016 IEEE/ACM Symposium on Edge Computing (SEC), IEEE, Oct. 27, 2016 (Oct. 27, 2016), pp. 64-76, XP033018397.

Bernard Jurgen et al.: "VIAL: a unified process for visual interactive labeling", Visual Computer, Springer, Berlin, DE, vol. 34, No. 9, Mar. 19, 2018 (Mar. 19, 2018), pp. 1189-1207, XP036569052, ISSN: 0178-2789, DOI: 10.1007/S00371-018-1500-3 (retrieved on Mar. 19, 2018).

Official Communication issued in International Patent Application No. PCT/JP2019/017237, dated Jun. 11, 2019, along with an English translation thereof.

* cited by examiner

*Fig.6*

| label | score |
|---|---|
| object b | 80 |
| object c | 5 |
| object d | 20 |
| object e | 30 |
| object g | 30 |
| object h | 0 |
| object i | 40 |
| . | . |
| . | . |
| . | . |
| . | . |

SYSTEM AND METHOD FOR GENERATING LABEL CANDIDATES RELATED TO RECOGNITION TARGET FOR SELECTION AND LEARNING

TECHNICAL FIELD

The present invention relates to a learning device, a learning system, and a learning method for generating learning data (i.e., training data) used for image recognition.

BACKGROUND ART

In recent years, image recognition technology, by which an object is recognized from a captured image shot by a camera, has been rapidly advanced with the use of machine learning technology such as deep learning. In image recognition by using machine learning technology, a number of data of captured images of a recognition target object as a subject are collected as learning data (i.e., training data), and a learner is trained with the collected training data to create a trained model, thereby enabling improvement in the accuracy of recognition of the recognition target in an unknown captured image through the use of the trained model.

In collection of such training data, collection of various images of recognition targets as training data is a time-consuming task, which involves shooting images with proper settings of two or more shooting conditions (such as camera settings, lighting settings, the way a recognition target object is placed).

Examples of known technologies for simplifying generation of training data include a training data generator which includes: image capturing means configured to associate each image of an object which is shot under a set of shooting conditions including at least location information about relative location of a camera with respect to the object, with a corresponding piece of shooting environment information which includes information records of the set of shooting conditions, while capturing images with changing the set of shooting conditions; and object area extraction means for extracting an object area corresponding to the object in each captured image, wherein the object area extraction means is configured to extract the object area from a first object image from which the object area is to be extracted, by using a second object image shot under a different set of shooting conditions from that of the first object image (Patent Document 1).

PRIOR ART DOCUMENT(S)

Patent Document(s)

Patent Document 1: JP2014-178957A

SUMMARY OF THE INVENTION

Task to be Accomplished by the Invention

In what is called supervised learning, preparation of each training data requires assigning a correctly corresponding label to that data. However, when a large amount of captured images are acquired as training data, it takes a long time for an operator (a person who operates) to enter labels therefor, which can be a heavy workload for the operator.

However, although the prior art as described in Patent Document 1 can provide captured images in which an object is shot with different shooting angles or with different ways the object is placed, the prior art has not taken into account the problem that assigning labels to data records can be a heavy workload for an operator.

The present invention has been made in view of the problem of the prior art, and a primary object of the present invention is to provide a learning device, a learning system, and a learning method which enable a reduction in a workload for a person who assigns labels to captured images in generation of training data for image recognition.

Means to Accomplish the Task

An aspect of the present invention provides a learning device for generating training data for image recognition from captured images generated by an image capturing device, the image capturing device being used to shoot an image of a recognition target, the learning device comprising: a processor configured to perform operations for generation of the training data; and a display device configured to display information based on the control of the processor, wherein the processor is configured to: acquire a captured image from the image capturing device; acquire, for the recognition target included in the captured image, one or more candidate objects recognized based on an identification model; and display, on the display device, information on the candidate objects as respective label candidates for the captured image.

Another aspect of the present invention provides a learning system comprising one or more of the learning devices, and one or more of the image capturing devices.

Yet another aspect of the present invention provides a learning method for generating training data for image recognition from captured images, the method being performed by an image capturing device which is used to shoot an image of recognition target, the method comprising: acquiring a captured image from the image capturing device; acquiring, for the recognition target included in the captured image, one or more candidate objects recognized based on an identification model; and displaying, on a display device, information on the candidate objects as respective label candidates for the captured image.

Effect of the Invention

A learning device, a learning system, and a learning method according to the present disclosure enable, in generating training data for image recognition, a reduction in a workload for a person who assigns labels to captured images.

BRIEF DESCRIPTION OF THE DRAWINGS

FIG. 6 is an explanatory diagram showing a first example of scores calculated in step ST204 in FIG. 4;

DESCRIPTION OF THE PREFERRED EMBODIMENT(S)

Figure 1:
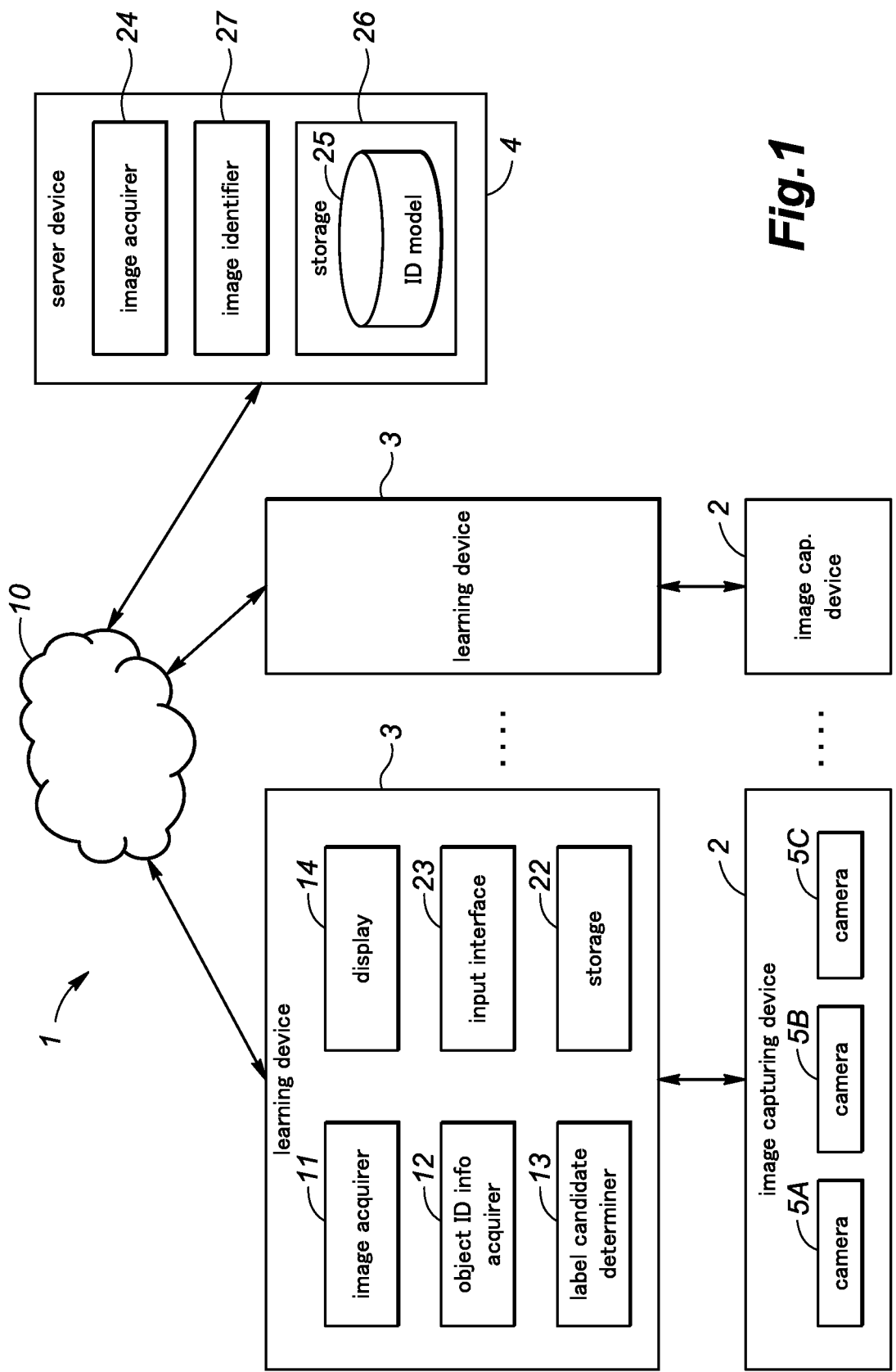
FIG. 1 is a diagram showing a general configuration of a learning system according to a first embodiment of the present disclosure.

A first aspect of the present invention made to achieve the above-described object is a learning device for generating training data for image recognition from captured images generated by an image capturing device, the image capturing device being used to shoot an image of a recognition target, the learning device comprising: a processor configured to perform operations for generation of the training data; and a display device configured to display information based on the control of the processor, wherein the processor is configured to: acquire a captured image from the image capturing device; acquire, for the recognition target included in the captured image, one or more candidate objects recognized based on an identification model; and display, on the display device, information on the candidate objects as respective label candidates for the captured image.

In this configuration, when generating training data for image recognition, the learning device acquires, for a recognition target in a captured image, one or more candidate objects recognized based on a prescribed identification model, and displays information on the one or more candidate objects as respective label candidates for the captured image. As a result, it is possible to reduce a workload for a person who assigns labels to captured images.

A second aspect of the present invention is the learning device of the first aspect, wherein the processor is configured to: assign one of the label candidates to the captured image as a label therefor, the one of the label candidates being selected by a user.

In this configuration, since the learning device assigns one of the label candidates displayed on the display device to the captured image as a label therefor, the one of the label candidates being selected by a user (a person who assigns labels to captured images), it is possible to reduce a workload for the user.

A third aspect of the present invention is the learning device of the first aspect, wherein the processor is configured to: display, along with the label candidates, an input screen in which a user can enter a label for training data, on the display device.

In this configuration, even when the label candidates displayed on the display device are not proper, a user can enter a label so that a proper label is assigned to the captured image.

A fourth aspect of the present invention is the learning device of the third aspect, wherein, when the user enters a label different from any of the label candidates in the input screen, the processor excludes the objects corresponding to the label candidates from the candidate objects for the recognition target to be recognized based on the identification model.

This configuration can avoid displaying improper label candidates on the display device in a repeated manner.

A fifth aspect of the present invention is the learning device of any one of the first to fourth aspects, wherein the processor is configured to: acquire a set of captured images of the recognition target, simultaneously shot from opposite directions; acquire, for the recognition target included in each image of the set of the captured images, one or more candidate objects recognized based on the identification model and respective recognition confidence scores for the candidate objects; and display, on the display device, information on the candidate objects as respective label candidates for each image of the set of the captured images based on the respective recognition confidence scores.

In this configuration, the learning device determines label candidates based on respective recognition confidence scores for recognition targets in the captured images shot from different angles, thereby enabling determination of a proper label candidate based on a captured image shot from a more appropriate angle (i.e., a captured image shot from such an angle that the recognition target can be recognized more easily).

A sixth aspect of the present invention is the learning device of the fifth aspect, wherein the processor is configured to: determine where the label candidates are to be located in a screen displayed on the display device based on the respective recognition confidence scores.

This configuration enables a user to easily recognize a more proper label candidate (i.e., a label candidate with a higher recognition confidence score) based on where the label candidates are located in a screen displayed on the display device.

A seventh aspect of the present invention is the learning device of the first aspect, wherein the processor is configured to: acquire a set of captured images of the recognition target, shot from different angles; acquire, for a recognition target included in each image of the set of the captured images shot from the different angles, one or more candidate objects recognized based on the identification model; and display, on the display device, information on the candidate objects as respective label candidates for each image of the set of the captured images shot from the different angles.

In this configuration, the learning device can display label candidates for each of the captured images of a recognition target shot from different angles. As a result, the learning device can present more proper label candidates even when the recognition target can be easily misrecognized as a different object in a captured image shot from a certain angle.

An eighth aspect of the present invention is a learning system comprising one or more of the learning devices of any one of the first to seventh aspects, and one or more of the image capturing devices.

In this configuration, when generating training data for image recognition, the learning system acquires, for a recognition target in a captured image, one or more candidate objects recognized based on a prescribed identification model, and displays information on the one or more candidate objects as respective label candidates for the captured image. As a result, it is possible to reduce a workload for a person who assigns labels to captured images.

A ninth aspect of the present invention is the learning system of the eighth aspect, further comprising a server device configured to calculate respective recognition confidence scores for the candidate objects recognized based on the identification model, wherein the processor is configured to acquire the recognition confidence scores calculated by the server device.

In this configuration, even when the learning system is provided with two or more learning devices, the server device can intensively perform operations of calculating recognition confidence scores, thereby improving the efficiency of the entire system.

A tenth aspect of the present invention is a learning method for generating training data for image recognition from captured images, the method being performed by an image capturing device which is used to shoot an image of recognition target, the method comprising: acquiring a captured image from the image capturing device; acquiring, for the recognition target included in the captured image, one or more candidate objects recognized based on an identification model; and displaying, on a display device, information on the candidate objects as respective label candidates for the captured image.

An eleventh aspect of the present invention is the learning method of the tenth aspect, further comprising assigning one of the label candidates to the captured image as a label therefor, the one of the label candidates being selected by a user.

A twelfth aspect of the present invention is the learning method of the tenth aspect, further comprising displaying, along with the label candidates, an input screen in which a user can enter a label for training data, on the display device.

A thirteenth aspect of the present invention is the learning method of the twelfth aspect, further comprising: when the user enters a label different from any of the label candidates in the input screen, excluding the objects corresponding to the label candidates from the candidate objects for the recognition target to be recognized based on the identification model.

A fourteenth aspect of the present invention is the learning method of any one of the tenth to thirteenth aspects, further comprising: acquiring a set of captured images of the recognition target, simultaneously shot from opposite directions; acquiring, for the recognition target included in each image of the set of the captured images, one or more candidate objects recognized based on the identification model and respective recognition confidence scores for the candidate objects; and displaying, on the display device, information on the candidate objects as respective label candidates for each image of the set of the captured images based on the respective recognition confidence scores.

A fifteenth aspect of the present invention is the learning method of the fourteenth aspect, further comprising determining where the label candidates are to be located in a screen displayed on the display device based on the respective recognition confidence scores.

A sixteenth aspect of the present invention is the learning method of the tenth aspect, further comprising: acquiring a set of captured images of the recognition target, shot from different angles; acquiring, for a recognition target included in each image of the set of the captured images shot from the different angles, one or more candidate objects recognized based on the identification model; and displaying, on the display device, information on the candidate objects as respective label candidates for each image of the set of the captured images shot from the different angles.

Embodiments of the present invention will be described below with reference to the drawings.

First Embodiment

FIG. 1 is a diagram showing a general configuration of a learning system according to a first embodiment of the present disclosure.

The learning system 1 mainly includes: a plurality of image capturing devices 2 which can be used by a user to shoot images of a recognition target; a plurality of learning devices 3 configured to perform an operation for generation of training data used for image recognition from captured images shot by a corresponding one of the image capturing devices 2 (hereinafter, referred to as "training data generation operation"); and a server device 4 configured to perform an operation for recognizing the recognition target included in the captured images shot by the image capturing devices 2 (hereinafter, referred to as target recognition operation).

Since the plurality of the image capturing devices 2 shown in FIG. 1 have the same configuration, these devices are not distinctively described unless otherwise required, in the following description. The same applies to the plurality of the learning devices 3.

Each of the image capturing devices 2 includes a plurality of cameras 5A-5C capable of simultaneously capturing images of a recognition target from different angles. The cameras are so arranged because such an arrangement enables the system to acquire a feature(s) or characteristics of the total appearance of each recognition target so that the identification device 4 can correctly identify the recognition target even when the way the recognition target is placed is changed. The cameras 5A-5C may be video cameras having a known shooting function, and capable of generating images (moving images or still images) of a recognition target 6 (see FIG. 2) as a subject. Furthermore, each of the image capturing devices 2 has a known communication function and capable of sequentially transmitting captured images to a corresponding one of the learning devices 3. Each image capturing device 2 can be connected to a corresponding learning device 3 through a known communication cable or wireless communications. In other cases, each image capturing device 2 may be connected to a corresponding learning device 3 via a known communication network (LAN or any other type of network).

The recognition target shot by the image capturing devices 2 is not limited to those shown in the drawings and described herein, and may be any object that can be a target of image recognition. The captured images generated by the cameras 5A-5C may have any form as long as they can be used for image recognition (i.e., identification of a recognition target). For example, the cameras 5A-5C may be equipped with RGB-D sensors so that RGB images and distance images are generated as captured images. Although, in the present disclosure, one image capturing device 2 is provided for each learning device 3, the configuration is not limited to this. In some embodiments, one image capturing device 2 may be provided for two or more learning devices 3.

In a learning device 3, an image acquirer 11 is configured to sequentially acquires captured images generated by a corresponding image capturing device 2. An object ID information acquirer 12 is configured to acquire one or more candidate objects which the server device 4 recognizes from captured images and respective scores (recognition confidence scores based on a prescribed identification model) therefor. A label candidate determiner 13 determines and displays, on a display 14, information records of the one or more candidate objects (e.g. names of objects) based on the acquired scores, as label candidates for each captured image.

In addition, a learning device 3 includes a storage 22 configured to store various pieces of information and data used for generation of training data, and an input interface 23 which is used by a user (for example, image capturing person) to perform an input operation to provide an input to the learning device 3. The display 14 can display any information necessary for a user with regard to the training data generation operation as appropriate, as well as the above described label candidates.

The server device 4 includes an image acquirer 24 configured to sequentially acquires captured images transmitted from the learning device 3, a storage 26 configured to store an identification model(s) (trained model(s)) 25 used for image recognition (identification of an unknown object), and an image identifier 27 configured to identify an object in a captured image as an unknown object by using the identification model (hereinafter, also referred to as "ID model") 25. The image identifier 27 is capable of identifying an object by using the identification model 25 by a known method.

The ID model 25 may be a trained model trained with training data which includes captured images provided from the plurality of learning devices 3. The learning system 1 may be configured such that the object ID information acquirer 12 of the learning device 3 extracts a feature amount of a recognition target (foreground region) included in a captured image and transmits information records of the extracted feature amount to the server device 4. In this case, the image identifier 27 of the server device 4 can identify the recognition target object by using the ID model 25 based on the feature amount transmitted from the learning devices 3.

Figure 2:
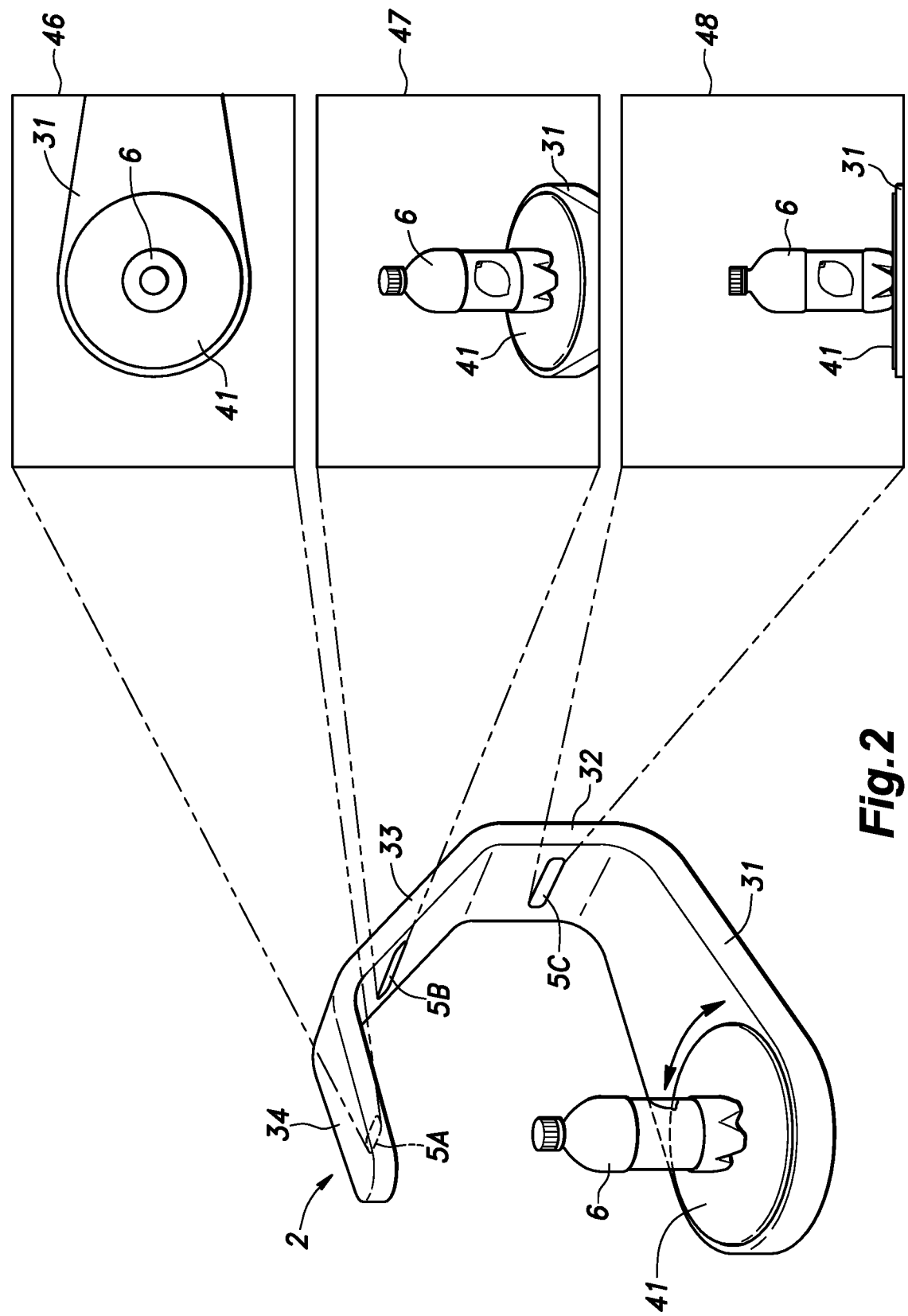
FIG. 2 is an explanatory diagram showing an example of a configuration of an image capturing device according to the first embodiment.

FIG. 2 is an explanatory diagram showing an example of a configuration of an image capturing device 2 shown in FIG. 1.

An image capturing device 2 includes: a substantially flat plate-shaped base portion 31 to be placed on the floor surface, desk surface, or any other surface; a substantially flat plate-shaped first arm portion 32 extending in the substantially vertical direction from one end of the base portion 31; a substantially flat plate-shaped second arm portion 33 extending diagonally upward from the upper end of the first arm portion 32 toward the other end of the base portion 31; and a third arm portion 34 extending in the substantially horizontal direction from the upper end of the second arm portion 33 toward the horizontal position of the other end of the base portion 31. Although not shown in FIG. 2, each image capturing device 2 further includes a built-in battery (or a power cable), a wireless communication device (or a communication cable) for communicating with a corresponding learning device 3, and other components or functional units.

The base portion 31 is provided with a turntable 41 which is rotatable on an axis in the vertical direction. A user can place the recognition target (in this embodiment, a beverage container) 6 on the turntable 41 and rotate the turntable 41 at a desired rotation angle to thereby change the shooting angles with which the recognition target 6 is shot by the cameras 5A-5C (i.e., change relative positions of the recognition target 6 with regard to the cameras 5A-5C).

The downward camera 5A is provided on the lower surface of the third arm portion 34. The viewing direction of the downward camera 5A is toward the turntable 41 on the lower side, and the downward camera 5A can shoot an image 46 which generally corresponds to a plan view of the recognition target 6.

The diagonally-directed camera 5B is provided on the lower surface (the inner side) of the second arm portion 33. The viewing direction of the diagonally-directed camera 5B is diagonally downward to the turntable 41, and the diagonally-directed camera 5B can shoot an image 47 which generally corresponds to a perspective view of the recognition target 6 viewed from above.

A side-view camera 5C is provided on the inner surface of the first arm portion 32 (on the side of the other end of the base portion 31). The viewing direction of the side-view camera 5C (located above the turntable 41) is a substantially horizontal direction, and the side-view camera 5C can shoot an image 48 which generally corresponds to a side e view of the recognition target 6.

The configurational characteristics of the image capturing device 2 (such as the number of cameras and the cameras' viewing directions) are not limited to those of the image capturing device 2 shown in FIG. 2, and various changes can be made thereto. Any configuration of the image capturing device 2 is possible as long as the image capturing device 2 includes at least one camera.

Figure 3:
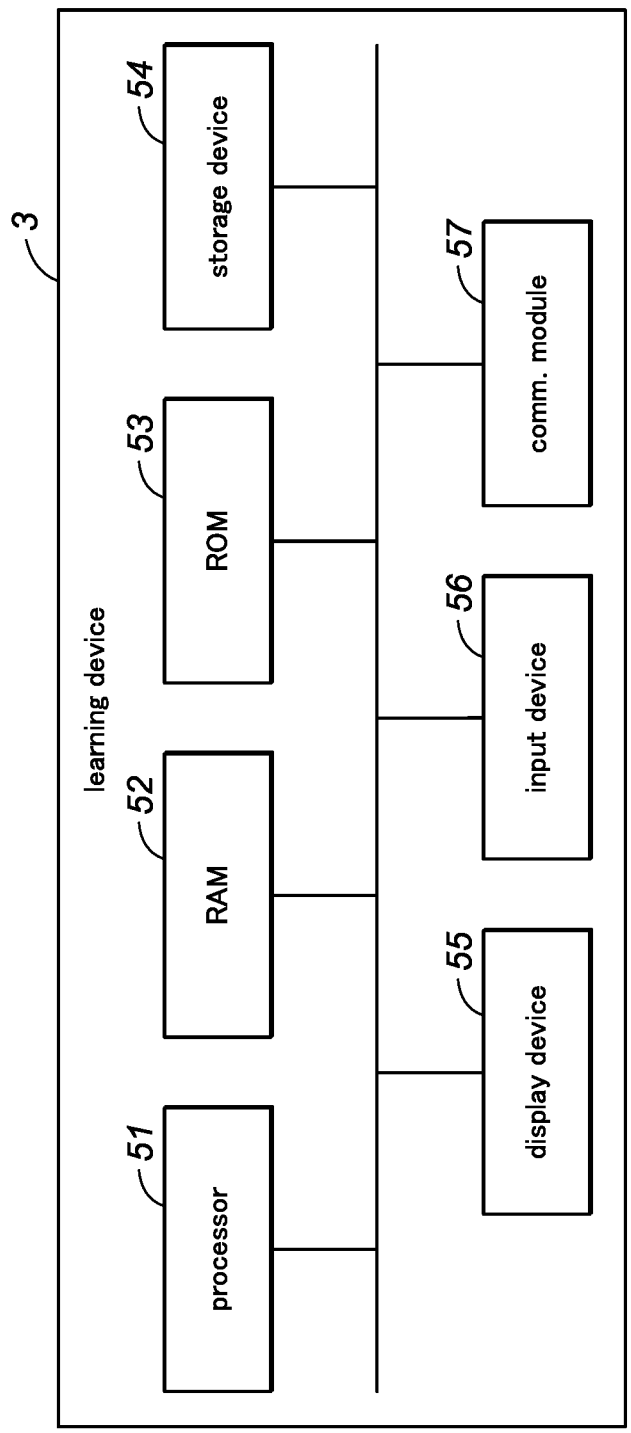
FIG. 3 is an explanatory diagram showing a hardware configuration of a learning device according to the first embodiment.

FIG. 3 is an explanatory diagram showing a hardware configuration of the learning device 3 in FIG. 1.

A learning device 3 is implemented by a computer having a known hardware configuration, and includes: a processor 51 configured to execute the whole training data collection operation (which can include the object recognition operation as necessary) based on prescribed control programs; a RAM 52 which is a volatile memory for functioning as a processing work area of memory for the processor 51; a ROM 53 which is a non-volatile memory for storing data and control programs executable by the processor 51; a storage device 54 such as an HDD, a flash memory, or any other storage device; a display device 55 such as a liquid crystal monitor; an input device 56 including interface devices such as a keyboard, a mouse, and a touch panel; and a communication module 57 used for communications with other devices.

The display 14, the storage 22, and the input interface 23 in a learning device 3 shown in FIG. 1 can be functionally implemented by the display device 55, the storage device 54, and the input device 56 shown in FIG. 2, respectively. In a learning device 3, the image acquirer 11, the object ID information acquirer 12, the label candidate determiner 13 can be at least partially functionally implemented by the processor 51 executing the control programs. The configurational characteristics of the learning device 3 are not limited to those shown in FIG. 3, and at least part of the functions of the learning device 3 may be implemented by an operation(s) performed by other known hardware, instead of being implemented by the learning device 3.

A hardware configuration of the server device 4, which is not described in detail, can be implemented by a computer having a known hardware configuration in a similar manner to the above-described learning device 3. The storage 26 can be implemented by the same device as the storage device 54. The image acquirer 24 and the image identifier 27 can be at least partially functionally implemented by the processor 51 executing the control programs.

Figure 4:
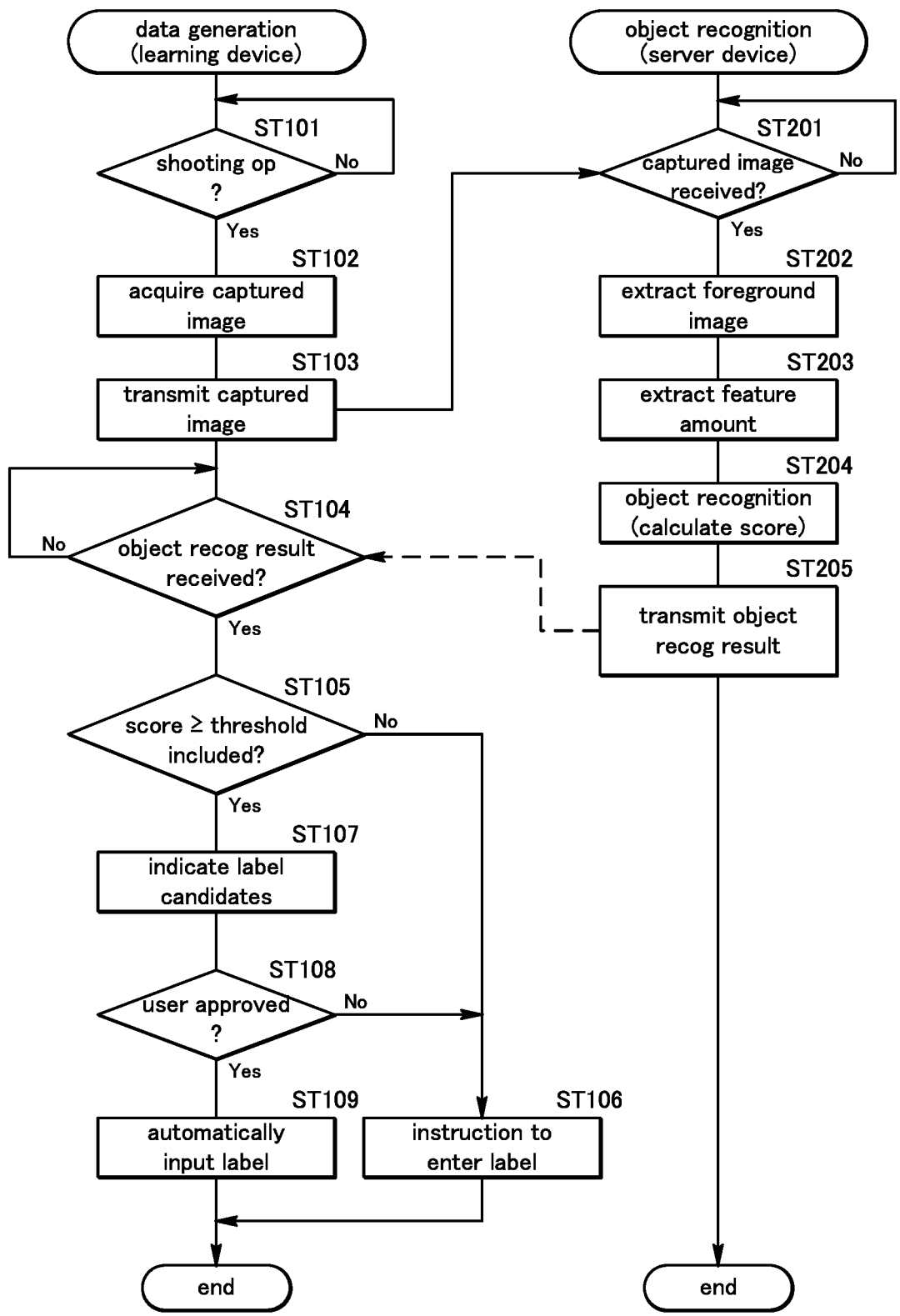
FIG. 4 is a flow chart showing a flow of each operation performed by the learning system according to the first embodiment.
Figure 5:
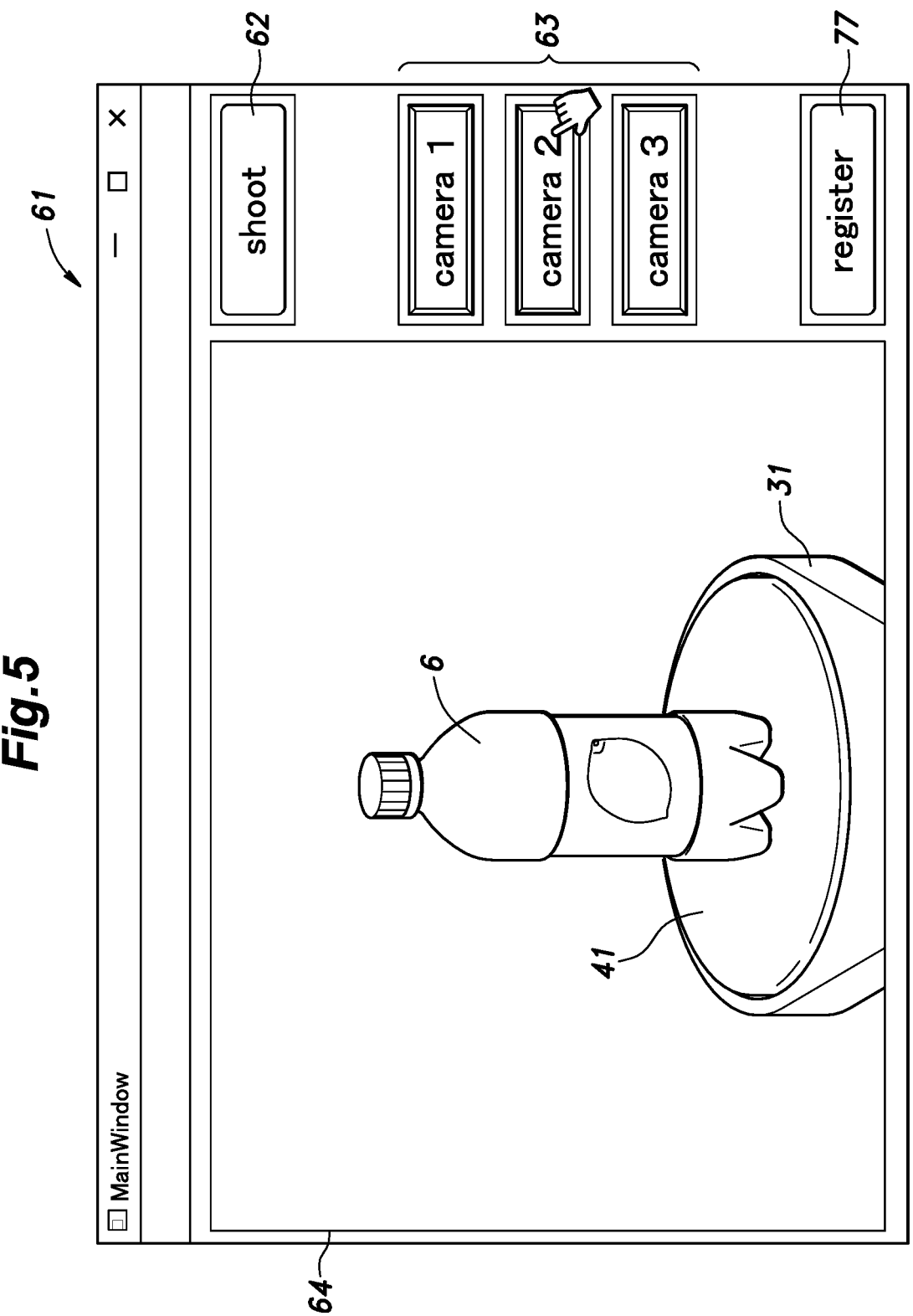
FIG. 5 is an explanatory diagram showing an example of an operation screen for a user in step ST101 in FIG. 4.
Figure 7:
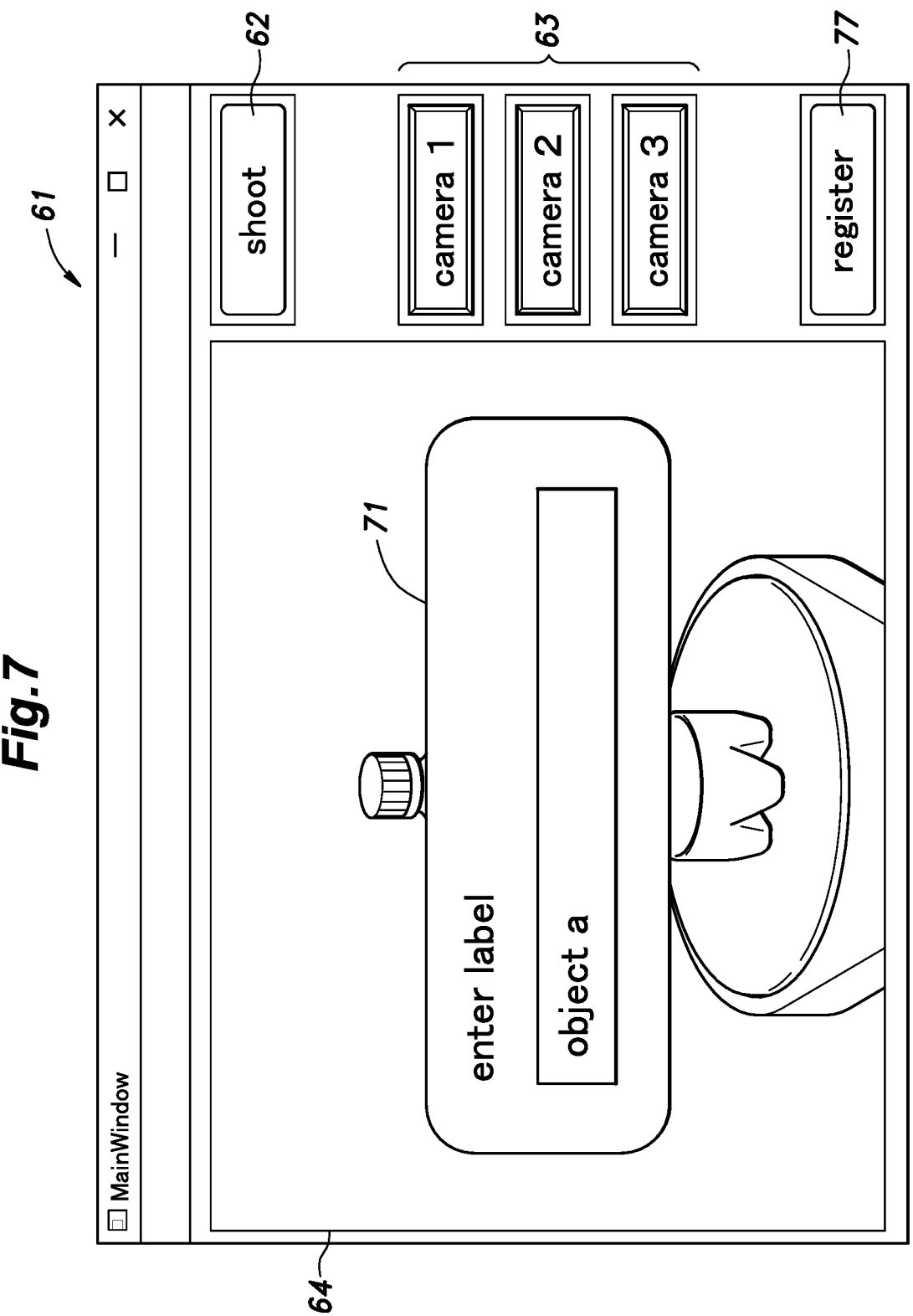
FIG. 7 is an explanatory diagram showing an example of an operation screen for a user in step ST106 in FIG. 4.

FIG. 4 is a flow chart showing a flow of each operation performed by the learning system 1 (the training data generation operation performed by the learning device 3 and the target recognition operation performed by the server device 4). FIG. 5 is an explanatory diagram showing an example of an operation screen for a user in step ST101 in FIG. 4, FIG. 6 is an explanatory diagram showing a first example of scores calculated in step ST204 in FIG. 4, FIG. 7 is an explanatory diagram showing an example of an operation screen for a user in step ST106 in FIG. 4, and FIGS. 8 to 11 are explanatory diagrams showing first to fourth examples of operation screens for a user in step ST107 in FIG. 4.

As shown in FIG. 4, when a user performs an operation of shooting a recognition target by using the image capturing devices 2 (Yes in ST101), a learning device 3 acquires captured images and related information (shooting conditions of the cameras 5A-5C, and other information) from a corresponding image capturing device 2 (ST102). In the present disclosure, the learning device 3 acquires shooting data including a set of captured images (three captured images) simultaneously shot by the cameras 5A-5C. However, the operation of the learning device 3 is not limited to this, and any operation method is possible as long as the learning system 1 can acquire at least one captured image.

In step ST101, the display device 55 displays, for example, a shooting screen 61 as shown in FIG. 5. A user can perform a shooting operation with any of the cameras 5A-5C by clicking (pressing) a shooting button 62 on the shooting screen 61. Moreover, the user can change the selection of an image currently displayed on an image display area 64 from those shot by the cameras 5A-5C by clicking (pressing) any of camera selection buttons 63 (pressing any button for the cameras 1-3).

Next, the learning device 3 transmits the captured image acquired from the image capturing device 2 to the server device 4 (ST103). In other cases as described above, the learning device 3 may be configured to extract a feature amount of the object and transmit the extracted feature amount to the server device 4 in step ST103.

When the server device 4 receives the captured image from the learning device 3 (Yes in ST201), the server device 4 extracts a foreground region of the captured image as an object (recognition target) (ST202), and extracts a feature amount from the foreground region (ST203). The server device 4 can extract a feature amount by using a known extraction method such as HOG (Histograms of Oriented Gradients) or SURF (Speeded-Up Robust Features), or a method using deep learning technology. Then, the server device 4 recognizes the object by using the ID model 25; that is, determines one or more candidate objects and calculates recognition confidence scores therefor based on the ID model 25 (ST204).

In step ST204, the server device 4 determines, as an object recognition result, recognized candidate objects (i.e., labels therefor which are used in the ID model 25) and their corresponding recognition confidence scores as shown in FIG. 6, for example.

In the present embodiment, a recognition confidence score is a value in the range of, for example, 0 to 100, and the higher the value is, the higher the certainty of recognition. The scores may be values in a different range as long as a value indicates a degree of certainty of recognition, i.e. a recognition confidence.

Subsequently, the server device 4 transmits information on an object recognition result in step ST204 (including recognized candidate objects (labels therefore) and their recognition confidence scores) to the learning device 3 (ST205).

When the learning device 3 receives information on an object recognition result from the server device 4 (ST104: Yes), the learning device 3 determines whether or not the object recognition result includes recognition confidence scores equal to or higher than a prescribed threshold value (i.e., determines whether or not there are candidate objects with higher recognition confidence) (ST105).

If the object recognition result includes no objection candidate with a recognition confidence score that is equal to or higher than the prescribed threshold value in step ST105 (No in ST105), the learning device 3 performs an operation to prompt a user to enter a label for a captured image the user has shot (a label for training data) (ST106).

In step ST106, the learning device 3 displays, for example, an input screen 71 for a user to enter a label, within the shooting screen 61 as shown in FIG. 7. In the input screen 71, a user can input a label (in this case, "object a") for a captured image (an object in the image). Accordingly, even when displayed label candidates are not proper, a user can enter a label so that a proper label is assigned to the captured image.

In step ST105, if the object recognition result includes one or more objects candidates with recognition confidence scores that are equal to or higher than the prescribed threshold value in step ST105 (Yes in ST105), the learning device 3 displays, on the display device 55, the candidate objects having scores equal to or higher than the prescribed threshold value as label candidates (ST107). When the learning device 3 receives a user's approval for a label candidate (any one of the label candidates) displayed on the display device 55 (Yes in ST108), the learning device 3 automatically inputs a label for the candidate object as a label for the captured image (i.e. records a label of training data) (ST109).

When the learning device 3 does not receive a user's approval for any label candidate (No in ST108), the learning device 3 performs the operation to prompt the user to enter a label for a captured image in the same manner as the step described above (ST106). In this case, when the user enters a label different from any of the label candidates displayed on the display device 55, the learning device 3 can transmit, to the server device 4, an instruction to exclude (remove the data of) the objects corresponding to the label candidates to which a user's approval was not assigned, from the candidate objects to be recognized in subsequent image recognition performed by the server device 4.

Figure 8:
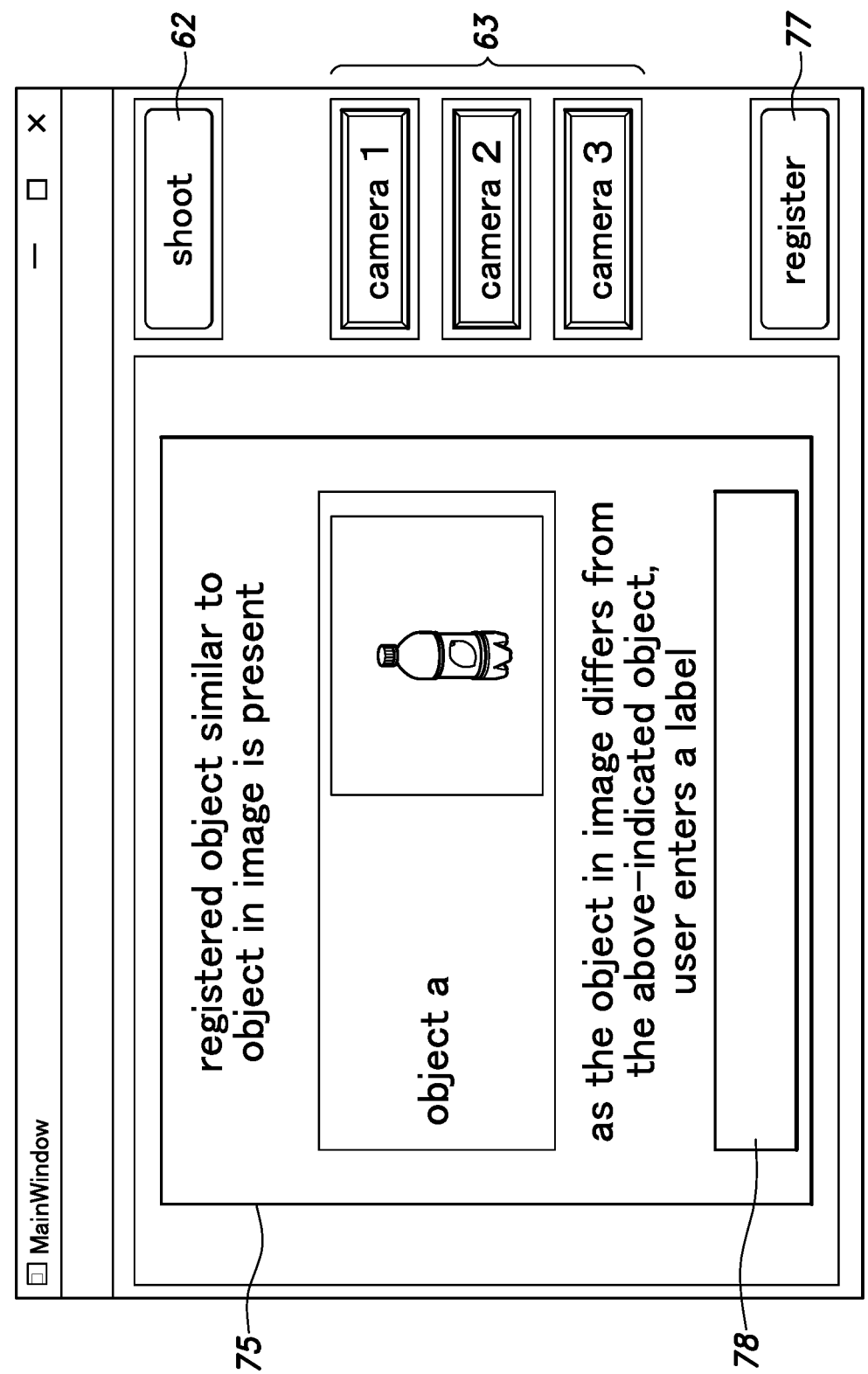
FIG. 8 is an explanatory diagram showing a first example of an operation screen for a user in step ST107 in FIG. 4.

In step ST107, the learning device 3 can display, for example, a recognition result screen 75 within the shooting screen 61 as shown in FIG. 8. FIG. 8 shows an example of the recognition result screen in which one candidate object (object a) with the highest score is displayed together with the image. When a user determines that the object a corresponds to the recognition target, the user can press a registration button 77 as an approval operation associated with step ST108. When the user determines that the object a does not correspond to the recognition target, the user can, as an operation associated with step ST106, enter a label (in this case, a name of an object other than the object a) corresponding to the captured image (the object therein), in a label input field 78 included in the recognition result screen 75.

Figure 9:
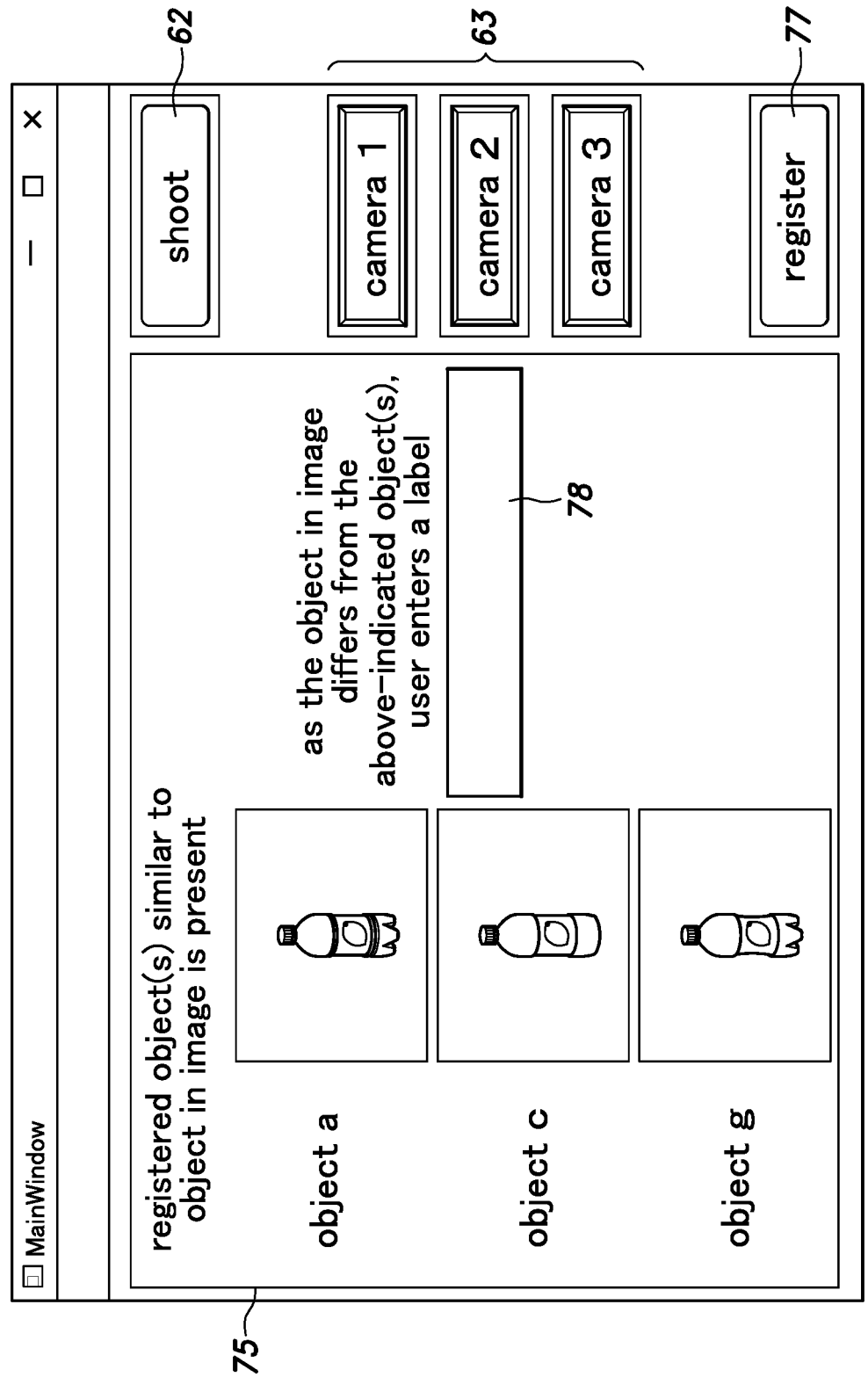
FIG. 9 is an explanatory diagram showing a second example of an operation screen for a user in step ST107 in FIG. 4.

In another example, in step ST107, the learning device 3 can display, for example, a recognition result screen 75 within the shooting screen 61 as shown in FIG. 9. FIG. 9 shows an example of the recognition result screen in which a plurality of candidate objects (objects a, c, g) with respective scores equal to or higher than a threshold value are arranged together with their images in descending order of score. When a user determines that one of the objects a, c, and g corresponds to the recognition target, the user selects (clicks) an image of that object on the recognition result screen 75 as an approval operation for step ST108, and then presses the registration button 77. When the user determines that none of the objects a, c, and g does not correspond to the recognition target, the user can, as an operation associated with step ST106, enter a label (in this case, a name of an object other than the objects a, c and g) corresponding to the captured image (the object therein), in the label input field 78 included in the recognition result screen 75.

Figure 10:
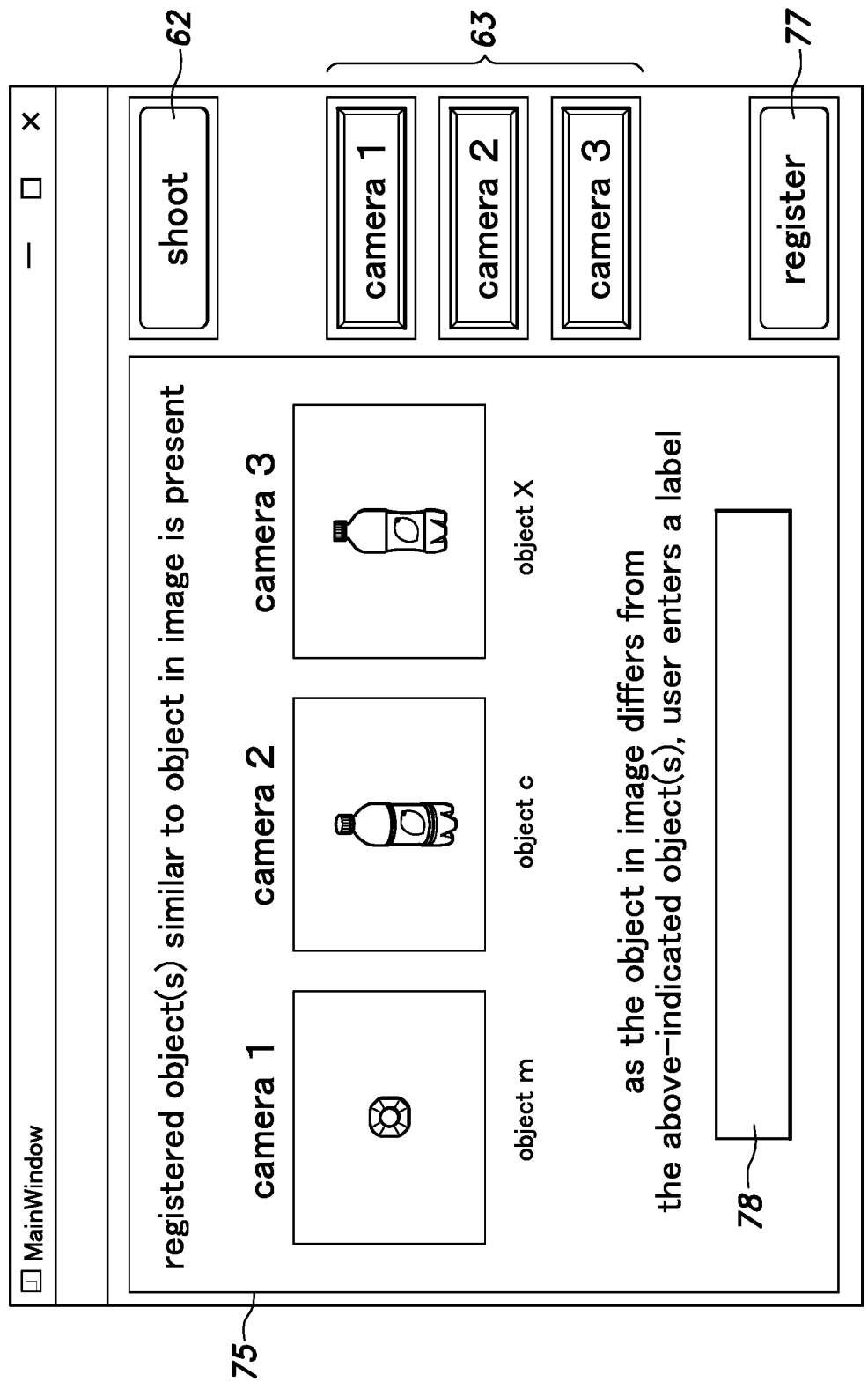
FIG. 10 is an explanatory diagram showing a third example of an operation screen for a user in step ST107 in FIG. 4.

In yet another example, in step ST107, the learning device 3 can display, for example, a recognition result screen 75 within the shooting screen 61 as shown in FIG. 10. FIG. 10 shows an example of the recognition result screen in which, for captured images (object(s) therein) shot by the cameras 5A-5C, respective candidate objects (objects m, c, and x) with scores equal to or higher than a threshold value are arranged together with their images in descending order of score from the left to the right. When a user determines that any of the objects m, c, and x corresponds to the recognition target, the user selects (clicks) an image of that object on the recognition result screen 75 as an approval operation for step ST108, and then presses the registration button 77. When the user determines that none of the objects m, c, and x does not correspond to the recognition target, the user can, as an operation associated with step ST106, enter a label (in this case, a name of an object other than the objects m, c, and x) corresponding to the captured image (the object therein), in the label input field 78 included in the recognition result screen 75.

In the above-described embodiments, the image capturing device 2 includes the fixed cameras 5A-5C, which are provided at respective fixed locations such that the facing directions of the cameras are not changed. However, images similar to those can be shot by those cameras can be acquired by using a single movable camera. Thus, in the example of showing respective candidate objects for the cameras in FIG. 10, a candidate object is indicated for a captured image shot from each shooting angle. In this case, even when a recognition target can be easily misrecognized as a different object in a captured image shot from a certain angle, the learning device can show the recognition target viewed from a different angle, thereby increasing the possibility of presenting a more proper label candidate.

Figure 11:
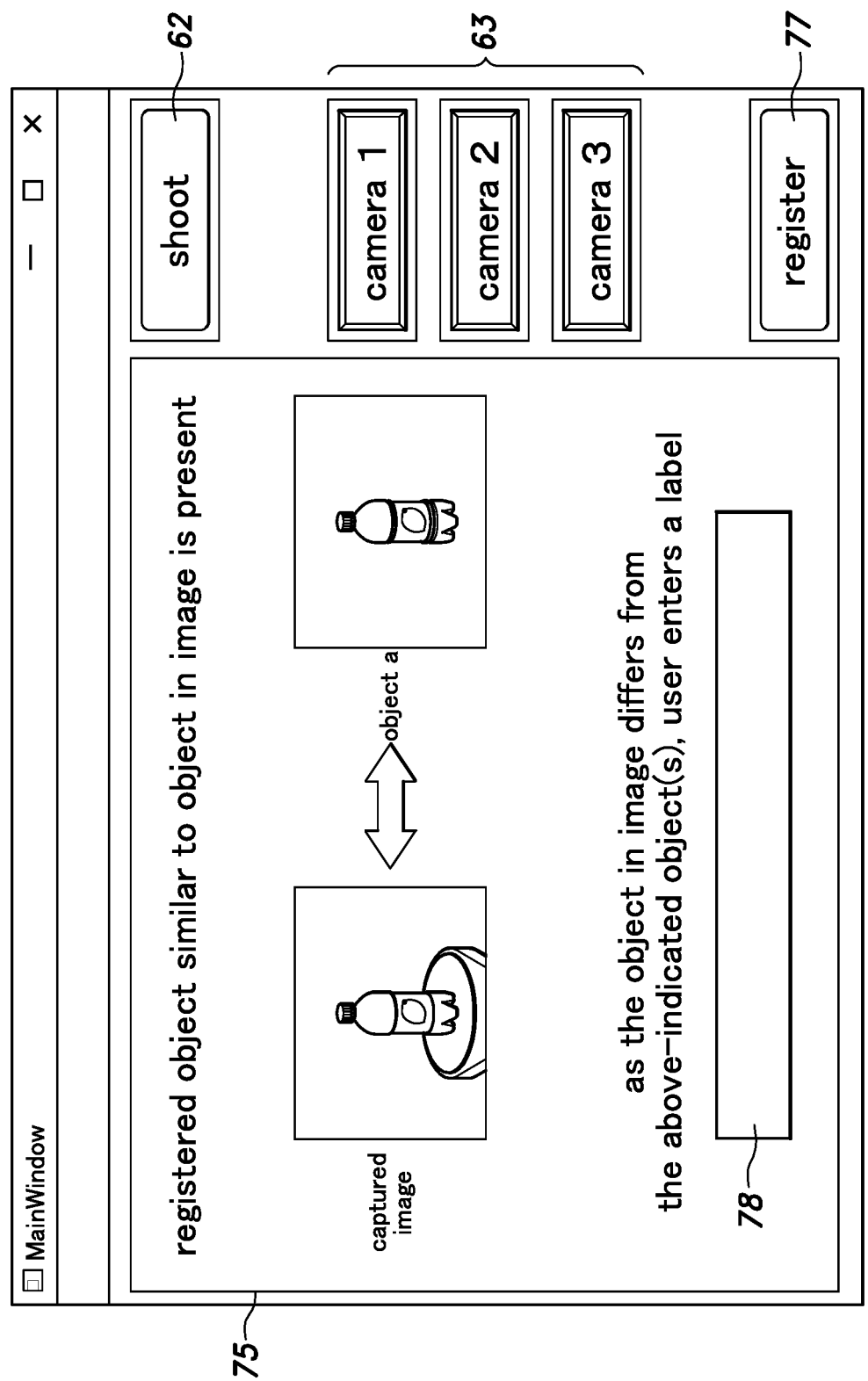
FIG. 11 is an explanatory diagram showing a fourth example of an operation screen for a user in step ST107 in FIG. 4.

In yet another example, in step ST107, the learning device 3 can display, for example, a recognition result screen 75 within the shooting screen 61 as shown in FIG. 11. FIG. 11 shows an example of the recognition result screen in which an object (object a) with a score equal to or higher than a threshold value is arranged together with its image and also with a corresponding captured image for comparison. When a user determines that the object a corresponds to the recognition target displayed in the captured image, the user can press the registration button 77 as an approval operation associated with step ST108. When the user determines that the object a does not correspond to the recognition target, the user can, as an operation associated with step ST106, enter a label (in this case, a name of an object other than the object a) corresponding to the captured image (the object therein), in the label input field 78 included in the recognition result screen 75.

In this way, when generating training data for image recognition, the learning system 1 acquires, for a recognition target 6 in a captured image, one or more candidate objects recognized based on a prescribed identification model, and displays information on the one or more candidate objects as respective label candidates for the captured image. As a result, it is possible to reduce a workload for a person who assigns labels to captured images.

In the present embodiment, the server device 4 transmits recognized candidate objects and their scores to the learning device 3, and the learning device 3 determines whether or not there are candidates with scores equal to or higher than a threshold value. However, the present invention is not limited to such configurations. In some embodiments, the server device 4 may determine whether or not there are candidates with scores equal to or higher than the threshold value, and transmit only the candidate objects with scores equal to or higher than the threshold value to the learning device 3. In this case, in cases where the server device 4 is capable of narrowing down the candidates, the server device does not need to transmit the determined scores to the learning device 3.

Second Embodiment

Figure 12:
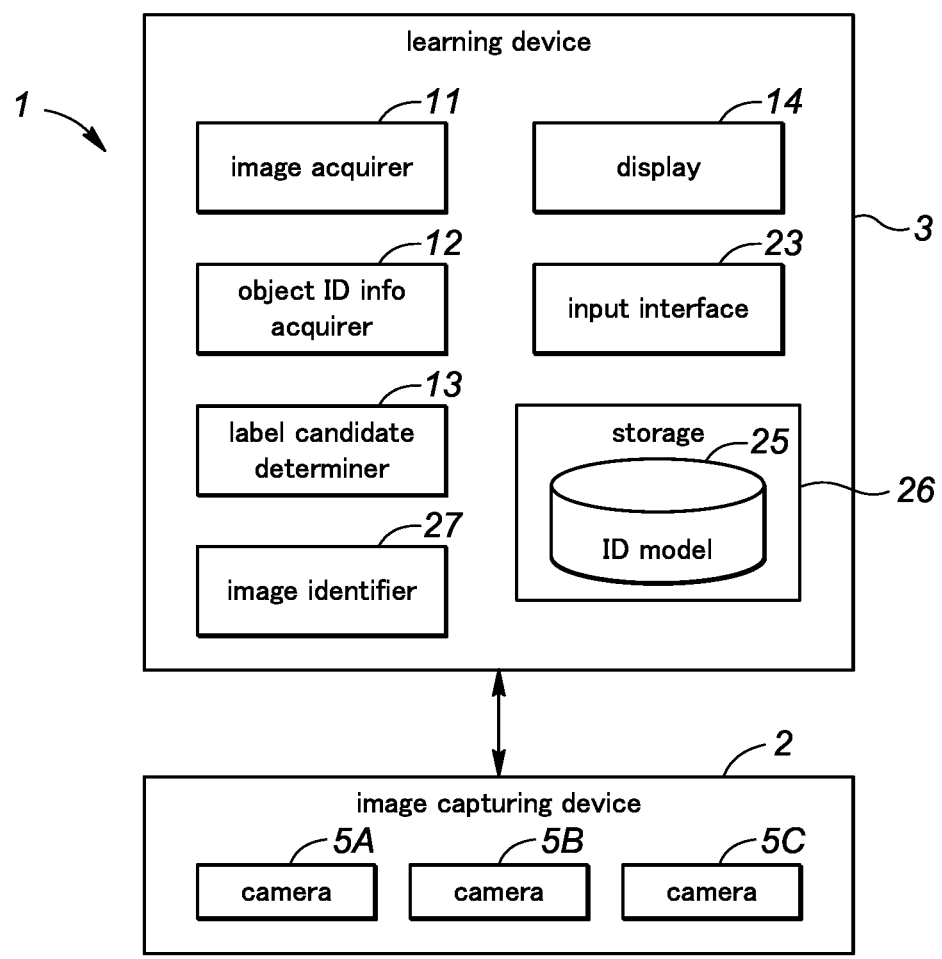
FIG. 12 is a diagram showing a general configuration of a learning system according to a second embodiment of the present disclosure.

FIG. 12 is a diagram showing a general configuration of a learning system 1 according to a second embodiment of the present disclosure. In FIG. 12, the same reference numerals are assigned to the same components as those shown in FIG. 1. Except for what will be particularly discussed below, the learning system 1 of the second embodiment is the same as that of the first embodiment described above.

In the above-described first embodiment, the server device 4 performs the object recognition operation. However, in the second embodiment, a learning device 3 is configured to include a storage 26 for storing an ID model (trained model) 25, and an image identifier 27 so that, in place of the server device 4, the learning device 3 can perform the object recognition operation.

As a result, in the learning system 1 according to the second embodiment, all the primary tasks necessary for the training data generation operation can be carried out only by the learning device 3.

Specific embodiments of the present invention are described herein for illustrative purposes. However, the present invention is not limited to those specific embodiments. In the learning device, the learning system, and the learning method as described above, not all elements therein are essential. Thus, various modifications including elimination of some elements may be made to the embodiments as appropriate without departing from the scope of the invention.

In the above-described embodiments, the ID model 25 is a trained model trained with training data which includes captured images provided from the plurality of learning devices 3. However, the present invention is not limited to such configurations. In case that a plurality of learning devices 3 cannot share a common trained model with each other, a prebuilt standard trained model may be prepared to be used as the ID model 25.

INDUSTRIAL APPLICABILITY

A learning device, a learning system, and a learning method according to the present disclosure achieve an effect of enabling a reduction in a workload for a person who assigns labels to captured images in generation of training data for image recognition, and are useful as a learning device, a learning system, and a learning method for generating training data used for image recognition.

GLOSSARY

1 learning system
2 image capturing device 3 learning device
4 server device
5A to 5C camera
6 recognition target
10 communication network
11 image capturer
12 object ID information acquirer
13 label candidate determiner
24 image capturer
25 identification model
26 storage
27 image identifier
41 turntable
46 to 48 shot image
51 processor
54 storage device
55 display device
56 input device
57 communication module
61 shooting screen
62 shooting button
62 camera selection button
64 image display area
71 input screen
75 recognition result screen
77 registration button
78 label input field

The invention claimed is:

1. A registration system, comprising:
a camera that captures an image including a recognition target; and
a computer including a processor which performs,
acquiring the captured image including the recognition target from the camera;
using an identification model residing in a learning device to acquire a plurality of label candidates,
each of the plurality of label candidates corresponding to the recognition target in response to the acquiring of the captured image, wherein the identification model being a model trained to identify an object in an image prior to acquisition of the captured image;
selecting a label among the plurality of label candidates to be proposed to a user for assignment to the captured image, wherein the selecting is performed based on scoring provided by the identification model;
outputting the selected label and appending the selected label on a display to provide additional display information; and
displaying, on the display, information on the selected label assigned to the captured image.

2. The registration system according to claim 1, wherein the processor is configured to:
assign one of the label candidates to the captured image as a label therefor, the one of the label candidates being selected by the user.

3. The registration system according to claim 1, wherein the processor is configured to:
display, along with the label candidates, an input screen in which the user can enter a label for training data, on the display.

4. The registration system according to claim 3, wherein, when the user enters a label different from any of the label candidates in the input screen, the processor excludes the objects corresponding to the label candidates from the candidate objects for the recognition target to be recognized based on the identification model.

5. The registration system according to claim 1, wherein the processor is configured to:
acquire a set of captured images of the recognition target, simultaneously shot from a plurality of directions different from each other;
acquire, for the recognition target included in each image of the set of the captured images, one or more candidate objects recognized based on the identification model and respective recognition confidence scores for the candidate objects; and
display, on the display, information on the candidate objects as respective label candidates for each image of the set of the captured images based on the respective recognition confidence scores.

6. The registration system according to claim 5, wherein the processor is configured to:
determine where the label candidates are to be located in a screen displayed on the display based on the respective recognition confidence scores.

7. The registration system according to claim 1, wherein the processor is configured to:
acquire a set of captured images of the recognition target, shot from different angles;
acquire, for a recognition target included in each image of the set of the captured images shot from the different angles, one or more candidate objects recognized based on the identification model; and
display, on the display, information on the candidate objects as respective label candidates for each image of the set of the captured images shot from the different angles.

8. A learning system comprising one or more of the registration systems according to claim 1.

9. The learning system according to claim 8, further comprising a server configured to calculate respective recognition confidence scores for the candidate objects recognized based on the identification model,
wherein the computer is configured to acquire the recognition confidence scores calculated by the server.

10. A registration method, comprising:
capturing, by a camera, an image including a recognition target;
acquiring a captured image including the recognition target from the camera;
using an identification model residing in a learning device to acquire a plurality of label candidates, each of the plurality of label candidates corresponding to the recognition target in response to the acquiring of the captured image, wherein the identification model being a model trained to identify an object in an image prior to acquisition of the captured image;
selecting a label among the plurality of label candidates to be proposed to a user for assignment to the captured image, wherein the selecting is performed based on scoring provided by the identification model;
outputting the selected label and appending the selected label on a display to provide additional display information; and
displaying, on the display, information on the selected label assigned to the captured image.

11. The registration method according to claim 10, further comprising assigning one of the label candidates to the captured image as a label therefor, the one of the label candidates being selected by the user.

12. The registration method according to claim 10, further comprising displaying, along with the label candidates, an input screen in which the user can enter a label for training data, on the display.

13. The registration method according to claim 12, further comprising:
when the user enters a label different from any of the label candidates in the input screen, excluding the objects corresponding to the label candidates from the candidate objects for the recognition target to be recognized based on the identification model.

14. The registration method according to claim 10, further comprising:
acquiring a set of captured images of the recognition target, simultaneously shot from a plurality of directions different from each other;
acquiring, for the recognition target included in each image of the set of the captured images, one or more candidate objects recognized based on the identification model and respective recognition confidence scores for the candidate objects; and
displaying, on the display, information on the candidate objects as respective label candidates for each image of the set of the captured images based on the respective recognition confidence scores.

15. The registration method according to claim 14, further comprising determining where the label candidates are to be located in a screen displayed on the display based on the respective recognition confidence scores.

16. The registration method according to claim 10, further comprising:
acquiring a set of captured images of the recognition target, shot from different angles;
acquiring, for a recognition target included in each image of the set of the captured images shot from the different angles, one or more candidate objects recognized based on the identification model; and
displaying, on the display, information on the candidate objects as respective label candidates for each image of the set of the captured images shot from the different angles.

17. The registration computer according to claim 1, further comprising:
generating registration data for object recognition from captured images by assigning the correct label selected from among the label candidates on the captured image.

18. The registration computer according to claim 17, wherein the registration data is training data for an additional learning of the identification model.

19. A registration computer that is connected to a camera via a network, the registration computer comprising:
a processor which performs,
acquiring an image captured by the camera, the captured image including a recognition target;
using an identification model residing in a learning device to acquire a plurality of label candidates, each of the plurality of label candidates corresponding to the recognition target in response to the acquiring of the captured image, wherein the identification model being a model trained to identify an object in an image prior to acquisition of the captured image;
selecting a label among the plurality of label candidates to be proposed to the user for assignment to the captured image, wherein the selecting is performed based on scoring provided by the identification model;
outputting the selected label and appending the selected label on a display to provide additional display information; and
displaying, on the display, information on the selected label assigned to the captured image.

* * * * *